Jan. 31, 1967   H. E. R. GRUNER   3,300,904
MACHINE FOR GENERATING ELLIPSOIDAL SURFACE
Filed June 11, 1964   5 Sheets-Sheet 1

HEINZ E. R. GRUNER
INVENTOR.

BY Frank C. Parker

ATTORNEY

HEINZ E. R. GRUNER
INVENTOR.

Jan. 31, 1967  H. E. R. GRUNER  3,300,904
MACHINE FOR GENERATING ELLIPSOIDAL SURFACE
Filed June 11, 1964  5 Sheets-Sheet 3

HEINZ E. R. GRUNER
INVENTOR.

BY Frank C. Parker

ATTORNEY

Jan. 31, 1967          H. E. R. GRUNER          3,300,904
          MACHINE FOR GENERATING ELLIPSOIDAL SURFACE
Filed June 11, 1964                              5 Sheets-Sheet 4
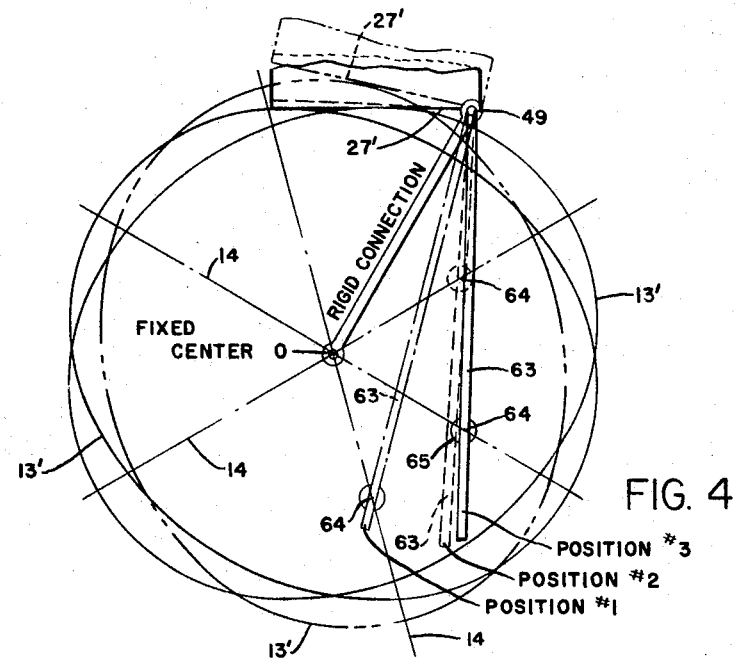
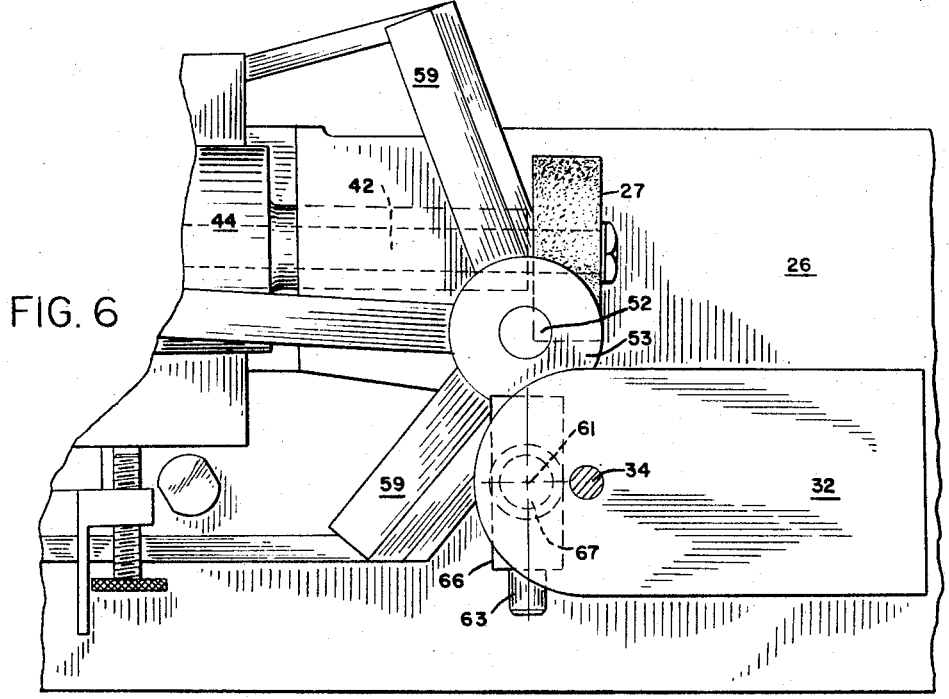
HEINZ E. R. GRUNER
INVENTOR.
BY *Frank C. Parker*
ATTORNEY

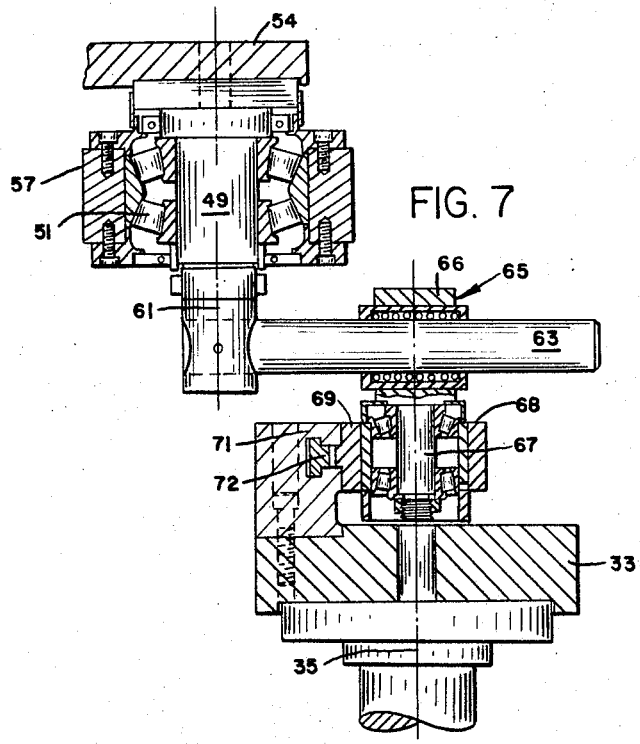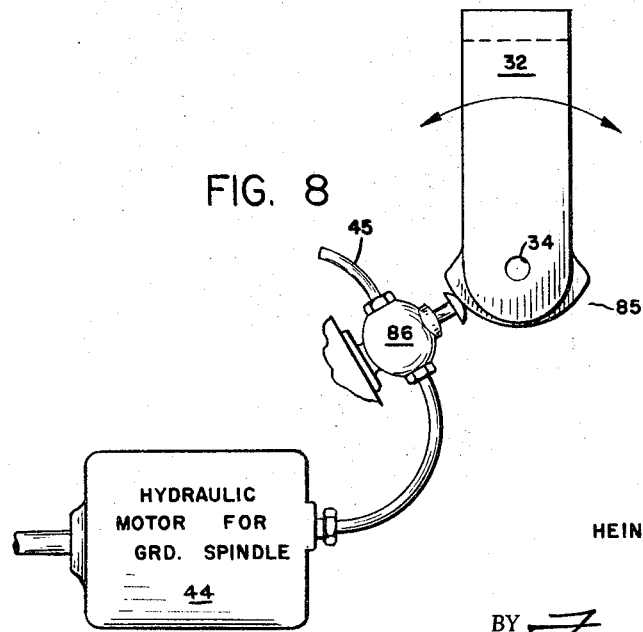

United States Patent Office 3,300,904
Patented Jan. 31, 1967

3,300,904
MACHINE FOR GENERATING ELLIPSOIDAL SURFACE
Heinz E. R. Gruner, Irondequoit, N.Y., assignor to Bausch & Lomb Incorporated, Rochester, N.Y., a corporation of New York
Filed June 11, 1964, Ser. No. 374,385
8 Claims. (Cl. 51—33)

This invention relates to a machine for generating an ellipsoidal surface of revolution on a body and more particularly concerns improvements specifically in such machines which serve to produce master or geometrical faithfulness and surface properties equivalent to ground and polished surfaces of optical elements.

Various methods and machines have been used in the past to produce an ellipsoidal surface of revolution on a body and each method, machine or apparatus was designed to satisfy some particular requirements such as, for instance, accuracy of shape, low cost of production or interchangeability of shape factors, etc. Some of the current elliptical body generating machines are developed for the attainment of certain of the named characteristics but the method or apparatus usually practiced is comparatively crude and involves the services of highly skilled machinists if a high standard of accuracy is required.

It is an object of the present invention to produce a novel machine for generating a continuous ellipsoidal surface of revolution on a body with true adherence to geometrical shape, said machine being easily changeable to accommodate a considerable range of body ratios of the major and minor ellipse axes and a variety of materials from which the ellipsoid is formed.

It is a further object to provide such a device which is sturdy and reliable in action, and is adaptable to the use of a variety of forming tools whereby various turning, grinding and polishing operations may be accomplished in a single set-up, thus resulting in a finished product of highest fidelity of geometrical shape and surface perfection compatible with optical surfaces.

Further, it is an object of this invention to provide such a device having means for maintaining a nearly constant surface speed or cutting effect for all positions of the forming tool on the ellipsoidal surface and to provide a continuous automatic forming process independent of operative skill and attendance.

Further objects and advantages will be apparent in the construction and arrangement of the details of the present invention from the specification hereinbelow taken together with the accompanying drawings, wherein.

Figure 1:
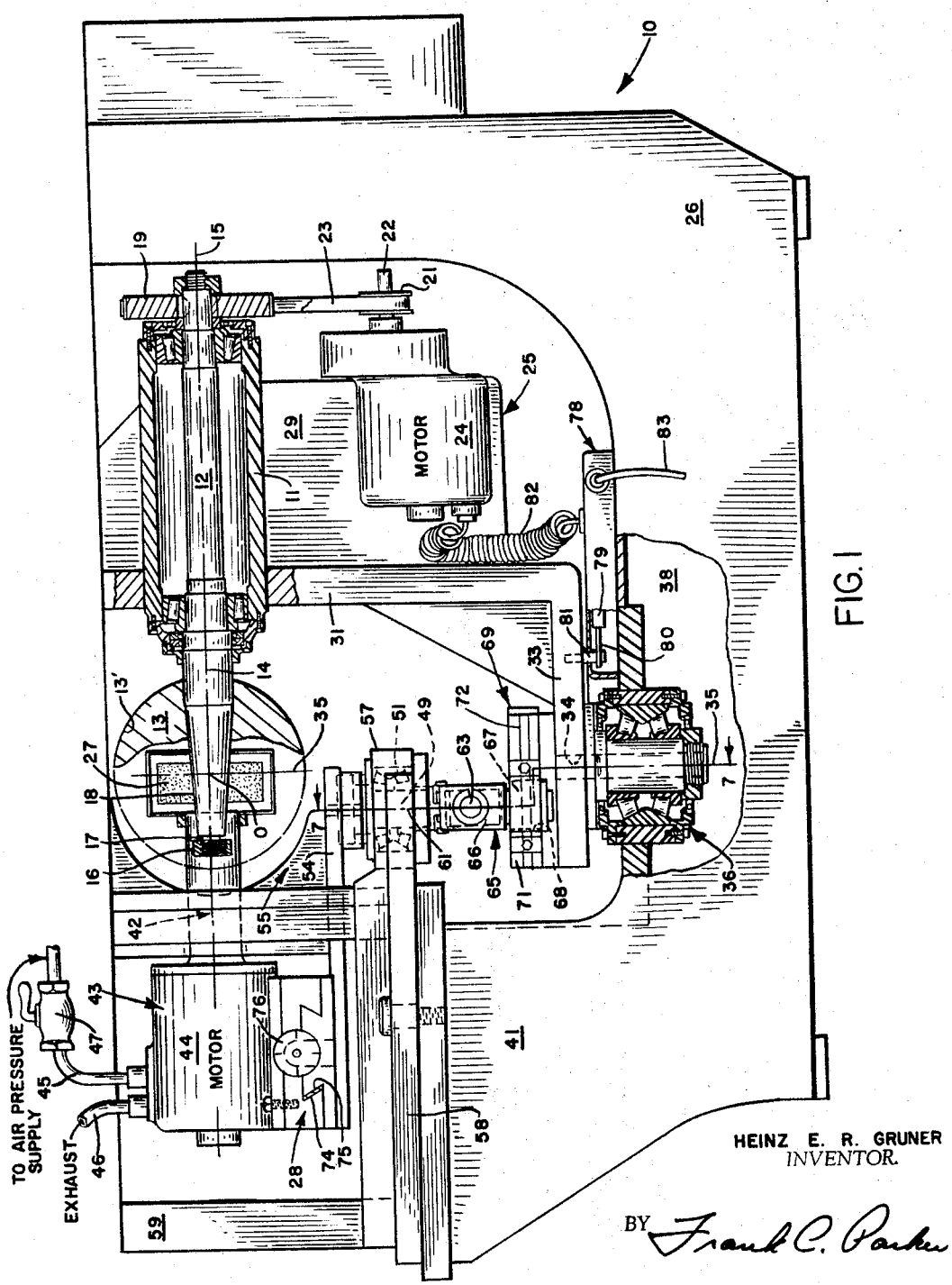
FIG. 1 is a side elevation of the lower part of a machine showing one form of the present invention in an operative position, certain parts of said machine being broken away and shown in section.
Figure 2:
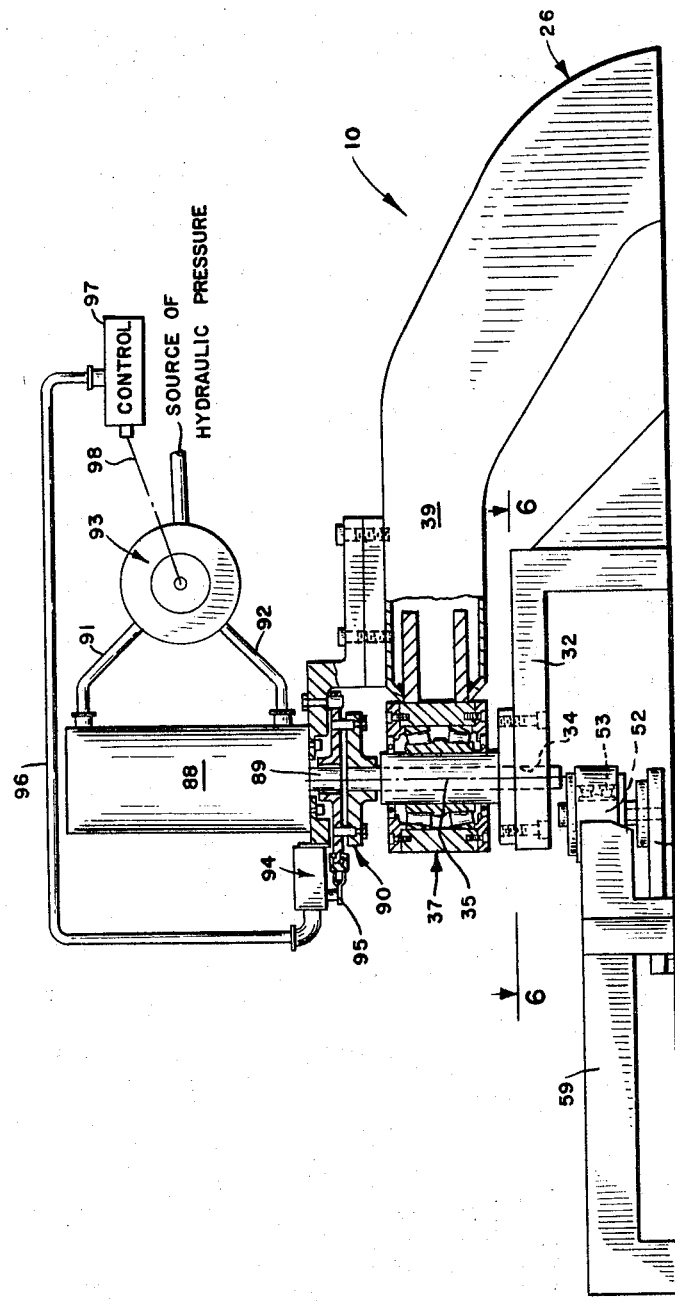
FIG. 2 is a view similar to FIG. 1 showing the contiguous upper part of said machine.
Figure 5:
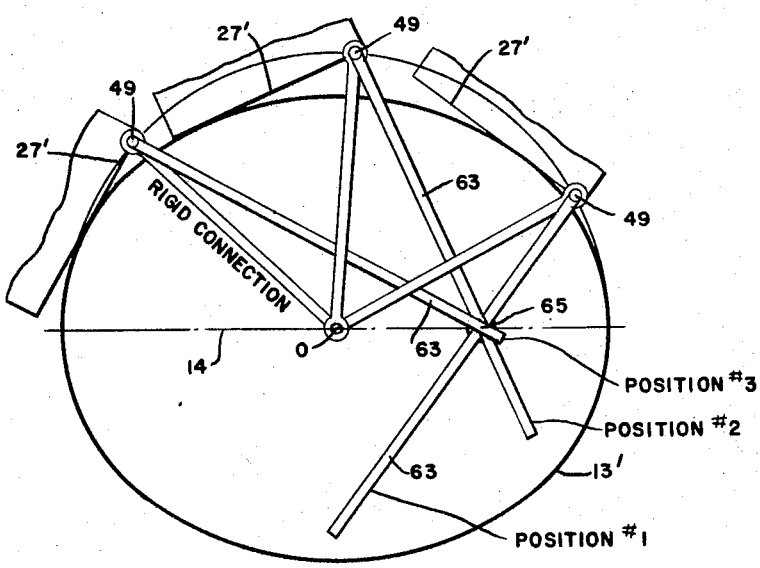
Figure 3:
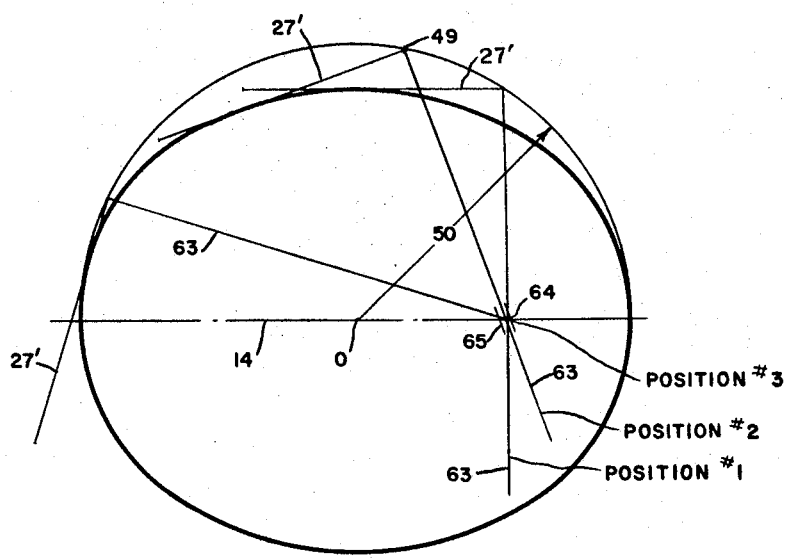

FIG. 3 presents the basic principle of ellipse generation derived from certain geometric properties of an ellipse as a conic section, the parts being shown in three positions;

FIG. 4 is a diagrammatic representation of a geometrical arrangement translated into mechanical operating parts illustrating the construction of said machine;

FIG. 5 is a horizontal schematic view similar to FIG. 4 of a second form of the invention of the kind shown in FIG. 3;

FIG. 6 is a horizontal sectional view taken on the line 6—6 of FIG. 2;

FIG. 7 is a vertical sectional view taken on the broken line 7—7 of FIG. 1; and

FIG. 8 is a semi-diagrammatic view of an alternate form of speed control for a functional group of certain operating parts of said machine.

The invention disclosed herebelow concerns a fully automatic ellipsoid shape generating machine, the shape generating parts of which are continuously coacting with each other to guide the forming tool precisely through a smooth path which establishes the elliptical contour. This distinguishes the machine from all methods and apparatus which utilize piecemeal operations successively and discontinuously to produce the ellipsoidal shape.

The automatic continuous process is especially advantageous in the production of ellipsoidal masters from which sectional copies can be made that are used in optical instrumentation as reflectors and image forming components.

In carrying this invention into practice, the body is mounted on a rotating horizontal arbor which, in the generating process, becomes the major axis of the basic ellipse and its minor axis rotates on the major axis to generate the equatorial plane of the ellipsoid. Simultaneously, the body is also rotated past a stationary forming tool about a vertical pivot axis which is normal upon the arbor axis. The point of intersection of both axes becomes the geometrical center of the body which is gradually and progressively shaped to become an ellipsoid. Other forms of this invention may with equal effect utilize a construction in which the ellipsoidal body rotates about its horizontal major axis only, while the forming tool pivots on the aforementioned vertical axis and moves from pole to pole in an arc around said body, the center of the arc being coincident with the center of said ellipsoidal body. It is furthermore within the purview of this invention to construct the machine so that the major axis of the ellipsoidal body extends nominally vertically instead of horizontally as shown, the other parts of the machine retaining their positions relative to said major axis.

In each case the ellipsoid generating machine embodies the aforementioned geometrical principle as described in "Technical Optics," vol. II, page 357, by L. C. Martin, as "Gullstrand mechanism."

The machine

In the form of the invention shown in the drawings, the machine is generally shown at 10 and it comprises a headstock 11 wherein is journaled a rotatable workshaft 12. On said workshaft 12 is mounted a body 13 on which an ellipsoidal surface 13' of revolution is to be formed, the major axis 14 of the ellipse being coincident with the axis of rotation 15 of said workshaft. Means of any preferred form such as a clamp nut 16 threaded onto a threaded shaft extension 17 are provided for securing the body 13 on the tapered portion 18 of said shaft 12.

Drive means comprising a driven pulley 19 fixed to shaft 12, and additionally a drive pulley 21 fixed to a power driven shaft 22, and an interconnecting drive belt 23 therefor are provided, the shaft being part of a variable speed electric or hydraulic motor 24.

The headstock 11 and drive mechanism 21, 22, 23 and 24 are fixed in proper driving relationship to each other onto a first mounting member 25 which is carried in a frame 26 to be described hereinafter.

At the level of the major axis 14 of the ellipsoidal surface 13', a suitable surface forming tool 27 is held, said tool being carried by a second mounting member 28.

In all forms of this invention, an important relationship exists between the first and second mounting members 25 and 28 respectively, i.e., one of said members must be mounted to swing about the other member as aforesaid, the pivot axis in either case extending through the center point O of said ellipsoidal surface 13.

In the form of the invention shown diagrammatically in FIG. 5, the second mounting member 28 swings about the first mounting member 25 around a pivot point O located at the center of the ellipsoidal surface.

In the form of the invention shown in the drawings, the first mounting member 25 is comprised of a vertical plate 29 to which is fixed said headstock 11 in any suitable manner such as welding or bolting in horizontal position thereon. Fixed along one vertical edge of said plate 29 is a flange 31 having formed thereon a pair of horizontal arms aligned in the vertical plane of said major axis 14. One of said arms 32 is positioned above and one arm 33 below the ellipsoidal body 13 in parallel arrangement with each other and parallel to said major axis 14.

For pivotally supporting said first mounting member 25 in the frame 26, a trunnion 34 is fixed to and near the outer end of each arm 32 and 33 in mutual alignment with each other along a vertical axis 35 and projecting outwardly from their respective arms, said axis intersecting the ellipse center O as aforesaid. Said trunnions 34 are fitted into suitable anti-friction bearings 36 and 37 which are fixed respectively into a base portion 38 and into an overhanging upper portion 39 of the frame 26. For the purpose of providing rigid stability of the entire machine, said frame is preferably constructed like a box girder in a general C-shape having the aforesaid base portion 38 and overhanging portion 39 which is superposed over the base portion. With the trunnions 34 so mounted, the first mounting member 25 may be swung from side to side through a full required angular travel of at least 180°.

The tool head

In this form of the invention, the aforementioned second mounting member or tool supporting mechanism 28 is substantially stationary and is carried on a horizontally raised pedestal 41 which is formed adjacent to said base portion 38 and the frame 26. As aforementioned, at the same elevation as the major axis 14 is positioned an elongated forming tool which in the illustrated form of the invention is a considerably elongated abrasive wheel 27 having an extended working face 27' as shown in FIGS. 3 and 4 and a special construction suitable for grinding or polishing. It will be understood that elongated turning tools, not shown, may also be substituted for the abrasive wheel.

The abrasive wheel 27 is mounted on a rotatable power operated spindle 42 which is a part of a tool head 43, said spindle being actuated by a suitable high speed motor such as the air-operated motor 44 shown in the drawings. Said motor 44 is operatively connected by inlet and outlet conduits 45 and 46 to a suitable source of air pressure such as a compressor, not shown, and the speed of the motor is controlled by a throttle valve 47 which is inserted in the inlet line.

An important feature of the present invention is the stationary but pivotal mounting for the tool head 43 whereby the working face 27' of the abrasive wheel 27 is continuously maintained in an angular position tangent to the geometrically true elliptical surface 13' of the body 13 during the excursion of the abrasive wheel 27 from one pole of the elliptical surface 13' to the other. During the excursion of said wheel 27 along the body surface 13', the point of tangency progresses along the face 27' of the elongated wheel 27 from one side thereof to the other as shown in FIGS. 3 and 5.

Said pivotal mounting is provided by a vertical trunnion 49 which is journaled by means of a suitable bearing 51 located below said wheel 27 at a radius equal to the semi-major axis 50 (FIG. 3) from the center O of the ellipsoidal surface 13'. Said pivotal mounting further comprises an upper trunnion 52 which is coaxially aligned with said trunnion 49 and is fitted into an upper bearing 53 which is situated above said wheel 27.

The vertical trunnion 49 is fixed to the lower horizontal arm 54 of a bifurcated yoke 55 having additionally an upper horizontal arm 56 formed thereon in vertical alignment with the lower arm. Coaxially with shaft 49 on said upper arm 56 is fixed said trunnion 52 as aforementioned, said yoke 55 on which the arms are formed being a part of the tool head 43.

Said lower and upper bearings 51 and 53 are securely seated in any desired manner respectively in an extension 57 formed on a horizontal stationary plate 58, and in an overreaching upper arm 59 formed on said plate so that the yoke 55 swings freely on a vertical axis 61 between said extension 57 and arm 59.

Actuation of the tool head

Means for guiding and moving the tool head 43 in its relatively small swinging movement, when the first mounting member 25 is concomitantly pivoted on vertical axis 35, are provided comprising an elongated guide rod 63 which is secured at a right angle to the cutting face of said tool 27 and projects outwardly therefrom in the direction of the focal point 64 of the ellipse which defines the body 13 and is located on its major axis 14, as shown in the diagram in FIGS. 3 and 4. In order to directionally position the axis of the guide rod 63 in a direction to continuously intersect focal point 64, a swivel joint 65 is provided having its axis extending parallel to vertical axis 35 and coincident with the focal point 64. Said swivel joint 65 includes a block 66 which is bored to slidably fit on the guide rod 63, and the block is pivotally connected with the lower arm 33 by a suitable stub shaft or trunnion 67 formed on the block 66 and located concentrically with the aforementioned focal point 64 as shown in FIG. 1. Trunnion 67 is fitted into a suitable bore 68 formed in a member carried by the lower arm 33 so that it moves with the arm.

For the purpose of providing adjustment of said swivel joint 65 in the direction of the major axis 14 to accommodate for body surfaces of different ellipticity and consequently different location of the focal point 64, there is provided a block or crosshead 69 wherein the bore 68 is formed to operatively fit said stub or trunnion 67. Said block 69 is slidably mounted in any preferred manner between a pair of retaining horizontal parallel guide rails, one of which is shown at 71, said rails being fixed by suitable retaining means in parallel relation to the major axis 14 onto the lower arm 33. Adjustment means of any desired form, such as a pair of longitudinal adjusting screws not shown, are provided, said screws bearing operatively against the opposed surfaces of the crosshead 69 to hold it in the properly adjusted position along the rails 71. In this form of the invention, it will be noticed that the pivots O and 35 are stationary while swinging movement is applied to the tool head 43 and the first mounting member 25 which holds the ellipsoidal body 13.

Tool feed mechanism

The mechanism by which the abrasive wheel 27 is fed toward the body 13 serves as a connection between the air-operated motor 44 and the lower horizontal arm 54 of the yoke 55 and in the preferred form it comprises a dovetail slide 74 which is fitted into a corresponding fitted slideway 75. The slide 74 and slideway 75 are arranged in a direction normal to the direction of the arms 54 and 56, the slide being fixed to the arm 54 and the slideway being secured to the base of the motor 44. A feed screw 76 is provided, said feed screw being swivelly secured in a conventional manner, not shown, in the slide mechanism so that rotation of said screw 76 causes the feeding motion of the abrasive wheel 27.

Automatic cutting speed compensation

If the abrasive wheel 27 always rotates on its own axis at constant speed, the real peripheral cutting speed of the wheel is inversely proportional to the radius R of the circle of latitude of the ellipsoidal surface 13' at the point of contact of said wheel, as shown in FIG. 3.

To compensate for the reduction in actual cutting speed of the abrasive wheel when the zonal radius R is reduced toward the polar regions of the ellipsoidal surface 13′, the speed of rotation of said body may be varied in such a manner that the sum of the circumferential speeds of the ellipsoidal body 13 and the abrasive or forming wheel 27 remain constant at the contact point throughout the full cycle of the machine. This result is preferably achieved by varying the peripheral speed of the surface 13′ rather than the grinding wheel 27 although either device or both may be used simultaneously if advantageous to do so.

As semi-diagrammatically shown in FIG. 1, the preferred form of speed control consists of a housing 78 which is secured in any preferred manner, not shown, to the frame 38. Within the housing 78 is positioned an arcuate rheostat 79 arranged concentrically with the trunnion 34. Said rheostat is actuated by a projecting arm 80 which is moved by a vertical pin 81 extending through a hole in said arm and freely fitted to project through an arcuate slot in the top of the housing. The upper end of the actuating pin 81 is fixed into the arm 33 so that swinging motion of the workshaft 12 causes the rheostat to operate. A flexible electrical connection 82 is provided to conduct the variable output of the rheostat to the motor 24 and a lead 83 is provided to connect the rheostat to a source of electrical power.

Alternate means may be provided for compensating said reduction in cutting speed as illustrated in FIG. 8 of the drawing, said means being of the cam operated type. As there shown, a radial cam 85 of compensatory configuration is formed in any preferred manner on the periphery of the upper swinging arm 32 of the body mounting member 25. An auxiliary throttle valve 86 is held stationary against the cam 85 in partly open condition by a suitable support, not shown, and as the cam is rotated by the arm 32, more air is admitted to the motor 44 to increase its speed by a proper amount which is directly proportioned to the instantaneous zonal radius of the contact point on the ellipsoidal surface 13′ as aforesaid.

*Power mechanism for swinging the headstock*

In order to apply torque to the upper trunnion 34 so as to swing the headstock 11 in a slow and vibrationless manner about the vertical axis 35 while generating the ellipsoidal surface 13′, a hydraulic actuator member generally designated by numeral 88 may be used as a preferred form in the present invention, said actuator member having means including a power shaft 89 operatively constructed to rotate a coupling member 90 situated between the actuator and trunnion 34. For convenience in mounting and servicing the actuator member 88, the coupling may be made easily separable. Hydraulic power for energizing the actuating member 88 is supplied through the service conduits 91 and 92 leading from a suitable control device 93 and power source, not shown.

Three typical operating positions of the movable workshaft 12 of the preferred form of the machine 10 in action are diagrammatically shown in FIG. 3.

*Actuator reversal mechanism*

The actuator member 88 is constructed in such a manner as to be reversible and is also provided in the hydraulic form heretofore disclosed. The reversal of action is accomplished preferably by reversing the flow of fluid in the service conduits 91 and 92. Means for effecting the reversal of fluid flow are provided in any preferred manner such as a suitable electrically controlled reversing valve which is diagrammatically shown at 93 in FIG. 2.

Means responsive to a predetermined rotation of the coupling 82 in either direction for accomplishing said reversal may also be provided comprising a suitable double throw limit switch 94 which is actuated by a pair of suitable peripherally located stops, one of which is shown at 95 secured on the rim of the coupling 90 so that the rotation thereof may be arrested at various angular positions. Limit switch 94 is connected by suitable leads 96 to a valve controlling device which is schematically shown at 97, and has an operating connection 98 to the valve 93.

When the coupling 90 rotates to a predetermined amount in one direction, one of the stops 95 engages the limit switch 94 and energizes the electrical control 97 to actuate the reversing valve 93.

It will be seen in the foregoing description that this invention provides among other features a machine which produces an ellipsoidal surface of revolution of fine accuracy by a continuous movement of the forming tool, the operation being fully automatic. It will further be noted that the machine is sturdily constructed for reliable and vibrationless operation and the mechanism which rigorously controls the geometrical properties of the elliptical body is adjustable for a range of sizes and proportions of major and minor axes thereof.

Although only certain forms and arrangements of the present invention have been shown and described in detail, other forms are possible and changes may be made in the arrangements and details of the parts of said machine without departing from the spirit of the invention as defined in the claims appended herebelow.

I claim:

1. A machine for generating a true ellipsoidal surface of revolution on a rigid body, said machine comprising a combination of coacting machine parts which are;
    a frame,
    a rotatable workshaft,
    means for securing said body on said shaft with the major axis of said surface coaxial therewith,
    power means operatively connected to rotate said shaft,
    a first mounting member on which said workshaft and power means connected for rotating said workshaft are operatively assembled,
    first pivot means which are constructed in fixed position in said first mounting member and are axially aligned in the equatorial plane of said ellipsoidal surface in spaced relation to said surface, said first mounting member being angularly movable relative to said frame in a plane which contains the major axis of said surface about said pivot means during generation of said surface,
    a second mounting member which carries a forming tool and is mounted in a stationary position on said frame,
    a tool head pivotally mounted on said second member,
    a second pivot means formed axially parallel to the first pivot means on the tool head and second mounting member cooperatively at a distance equal to the semi-major axis of the ellipsoidal surface away from the first pivot means and coplanar therewith so that said tool head may turn thereon,
    a forming tool operatively mounted on said tool head, said tool being characterized by an elongated machining surface which is positioned substantially coplanar with said major axis and includes a point on the axis of the second pivot means,
    a swivel joint carried by said first mounting member at a stationary position thereon which is located in a plane parallel with the major axis and including a focal point of the ellipsoidal surface,
    an elongated and rigid guide rod fixed to said tool head to turn it and extending into engagement with said swivel joint,
    said rod and joint being cooperatively formed to provide a sliding connection therebetween whereby as the angular relationship changes between the first and second mounting member, the rod slides in said joint and pivots about it to move the machining surface of said tool in such a manner as to maintain said surface tangent to the true geometrical shape of said ellipsoidal surface.

2. A machine for generating an ellipsoidal surface of revolution on a rigid body, said machine having the combination of,
a frame,
a first mounting member,
a horizontal rotatable workshaft on which said body is secured with the major axis of said ellipsoidal body coaxial with the axis of said workshaft,
a headstock in which said workshaft is rotatably journaled, the headstock being fixed on said first mounting member,
first pivot means for pivotally mounting said first member on said frame for swinging motion about a fixed vertical axis which is coextensive with the minor axis of said ellipsoidal body,
a second mounting member secured in a stationary position on said frame,
a surface forming tool characterized by a straight elongated working face,
a tool head on which said tool is held with its alignment axis located in a horizontal plane containing the major axis of said ellipsoidal surface,
second pivot means which are cooperatively constructed on the second mounting member and said tool head at a horizontal distance from said first pivot means equal to the semi-major axis of the ellipsoidal surface so that the tool head is pivotally mounted on the second member,
an elongated rigid guide rod fixed to said tool head and extending therefrom normal to the working face of the tool through a focal point of the ellipsoidal surface,
a swivel joint carried by said first mounting member and pivotable about a vertical axis extending through said focal point,
a guide block formed on said swivel joint and a circular wall defining a bore therethrough which is slidably fitted to support the free end of said guide rod,
whereby during the angular movement of the first mounting member about the first pivot means, the guide rod causes the working face of said tool to swing about the second pivot means and continuously maintain the tool face in a position to form a true ellipsoidal surface of revolution.

3. A machine for generating a true ellipsoidal surface of revolution on a rigid body, said machine having in combination
a power driven rotatable workshaft,
means for securing said body on the workshaft with the major axis of the body coincident with the workshaft axis,
a first mounting member on which said workshaft is journaled,
a pair of parallel and spaced mounting arms formed on said first mounting member, said arms projecting horizontally on opposite sides of said workshaft in spaced relation to said body,
a pair of aligned pivot elements formed on the outer ends of said mounting arms with their axes lying in the equatorial plane of said ellipsoidal surface,
a reversed C-shaped machine frame characterized by an upper and a lower portion which overhang and underlie respectively the first mounting member,
a pair of bearings in which the first pivot elements are operationally fitted, said bearings being held in said upper and lower portion of said frame for pivotally mounting said first mounting member,
a pedestal portion formed on the lower portion of said frame near the lower part of said pivot elements,
a second mounting member fixed to said pedestal portion, said member comprising a base plate and an upper plate secured a fixed distance above the base plate,
a tool head and a pair of horizontal bearing supporting arms formed thereon,
pivot means cooperatively formed on both the base plate and upper plate of the second mounting member and on said pair of bearing supporting arms, said means being located on a vertical axis which is horizontally separated from the vertical axis through the center of the ellipsoidal surface by a distance which is equal to the semi-major axis of said body,
a forming tool having an elongated horizontal machining surface, the axis of which is located in a horizontal plane which also contains the axis of the workshaft and is supported by said tool head,
a guide rod fixed at one end in said tool head in a plane lying normal to said horizontal machining surface and including said vertical axis,
a swivel joint fixed on one of said mounting arms on a second vertical axis which is coextensive with a focal point of said ellipsoidal surface, said joint having a guide block formed thereon, said block having a bore formed horizontally therethrough which is slidably fitted to receive said rod,
whereby angular displacement of the first mounting member causes the swivel joint and the rod to pivot the tool about said pivot means and move the machining surface of the tool into successive positions which are tangent to a true ellipsoidal surface conforming to the dimension of the semi-major axis and the eccentricity of the focal point, both of which have been established at the beginning of the forming operation.

4. A machine for generating a true ellipsoidal surface of revolution on a rigid body, said machine having in combination
a power driven rotatable workshaft,
means for securing said body on the workshaft with the major axis of the body coincident with the workshaft axis,
a first mounting member on which said workshaft is rotatably journaled, and a power drive operably connected thereto,
a parallel pair of mounting arms formed on said first mounting member, said arms projecting horizontally on opposite sides of said workshaft in spaced relation to said body,
a pair of pivot elements formed on the outer ends of said mounting arms in alignment with the minor axis of said ellipsoidal surface,
an erect machine frame characterized by an upper and a lower portion which overhang and underlie respectively the first mounting member,
a pair of bearings in which are rotatably fitted the first pivot elements, so that said first mounting member is mounted for swinging movement about said pivot elements,
means including a slow acting constant speed actuator and a torsional drive connection operatively constructed between said motor and said first mounting member for effecting said swinging movement,
a pedestal portion formed on the lower portion of said frame near said pivot elements,
a second mounting member fixed to said pedestal portion, said member comprising a base plate and an upper plate secured a fixed distance above the base plate,
a tool head on which are formed a pair of horizontal supporting arms,
second pivot means cooperatively formed on both the base plate and upper plate of the second mounting member and on said pair of horizontal supporting arms, said means being located on a second vertical axis which is separated from a first vertical axis which is projected through the center of the ellipsoidal body at a horizontal distance which is adjusted to the length of the semi-major axis of said body, an axially elongated abrasive wheel which is rotatably horizontally mounted in said tool head, the line of contact of said wheel with the body being located in a horizontal plane which contains the axis of the workshaft and intersects said second vertical axis, a guide rod fixed at one end in said tool head in a plane lying normal to said wheel and including said vertical axis, a swivel joint fixed on one of said mounting arms and located on a third vertical axis which is coextensive with a focal point of said ellipsoidal surface, said joint having a guide block formed thereon, said block having a circular surface defining a bore which is formed horizontally therethrough and is slidably fitted to receive said rod, whereby angular displacement of the first mounting member causes the swivel joint and the rod to pivot the tool about said second vertical axis and move the active surface of the wheel into successive positions which are tangent to the optimum shape of said ellipsoidal body.

5. A machine for generating a true ellipsoidal surface of revolution on a rigid body, said machine having in combination a driven rotatable workshaft, means for securing said body on the workshaft with the major axis of the body coincident with the workshaft axis, a first mounting member on which said workshaft is mounted, a power drive including a source of power operably connected to said workshaft and held by said member, a U-shaped pair of mounting arms formed on said first mounting member, said arms projecting horizontally on opposite sides of said workshaft in spaced relation to said body, a first pair of pivot elements formed on the outer ends of said mounting arms in alignment with the minor axis of said ellipsoidal surface, an erect machine frame characterized by an upper and a lower portion which overhang and underlie respectively the first mounting member, a pair of bearings in which are rotatably fitted the first pivot elements, so that said first mounting member is mounted for swinging movement about said first pivot elements, means including a slow acting constant speed actuator for effecting said swinging movement, a power shaft on said actuator and a rotational control member secured thereon, actuator reversing means for reversing the action of said actuator, means responsive to a predetermined amount of rotation of said control member in either direction for activating said reversing means, a pedestal portion formed on the lower portion of said frame near said first pivot elements, a second mounting member fixed to said pedestal portion, said member comprising a base plate and an upper plate secured a fixed distance above the base plate and parallel thereto, a tool head on which are formed horizontally a pair of extended bearing supports in the form of a yoke, pivot means cooperatively formed on both the base plate and upper plate of the second mounting member and on said pair of horizontal bearing supports, said means being located on a second vertical axis which is horizontally separated from a first vertical axis which is projected through the center of the ellipsoidal surface by a horizontal distance equal to the length of the semi-major axis of said body, an abrasive wheel having its axis located in a horizontal plane which includes the axis of the workshaft, said wheel being supported and directed in its angular movement by said tool head, a guide rod fixed at one end in said tool head and extending normal to the axis of said wheel, a swivel joint fixed on one of said mounting arms coaxially with a vertical axis which is coextensive with a focal point of said ellipsoidal surface, said joint having a guide block formed thereon, said block having guide means formed horizontally therethrough which are slidably fitted to receive said rod, whereby angular displacement of the first mounting member causes the swivel joint and the rod to pivot the tool about said second vertical axis and move the machining surface of the tool into successive positions which are tangent to the shape of said ellipsoidal body.

6. A machine for generating a true ellipsoidal surface of revolution on a rigid body of homogeneous material, said machine comprising a combination of coacting machine parts which are, a frame, a rotatable workshaft, means for securing said body on said shaft with the major axis of said ellipsoidal surface coaxial therewith, power means operatively connected to rotate said shaft, a first mounting member, and means for operatively mounting said workshaft and power means thereon, first pivot means which are located vertically in said frame and are coaxially aligned with the minor axis of said ellipsoidal surface and in spaced relation thereto, said first mounting member being angularly movable relative to said frame about said pivot means, a second mounting member which carries an abrasive wheel and is mounted in a stationary position on said frame, a tool head pivotally mounted on said second member, second pivot means formed vertically on the tool head and second mounting member cooperatively at a horizontal distance equal to the semi-major axis of the ellipsoidal surface away from the first pivot means, and coplanar therewith so that said tool head is rotatable thereon, means for pivotally moving the first mounting member so as to swing in a plane which includes said major axis of the ellipsoidal surface, one member moving angularly relative to the other member about said first pivot means during generation of the ellipsoidal surface, an axially elongated abrasive wheel operatively supported on said tool head, the line of contact on the surface of the wheel intersecting the axis of the second pivot means and being horizontally coplanar with the major axis of said ellipsoidal surface, a swivel joint carried by said first mounting member at a stationary position in vertical alignment with a focal point of the ellipsoidal surface, an elongated rigid guide rod fixed to said tool head so as to extend into engagement with said swivel joint, said rod and joint being cooperatively formed to provide a sliding connection therebetween whereby during changes of the angular relationship between the first and second mounting members, the rod slides in said joint as its pivots to move said line of contact of the abrasive wheel into continuously successive positions on said ellipsoidal surface thereby generating the true shape of said ellipsoidal surface.

7. A machine for generating a true ellipsoidal surface of revolution on a rigid body, said machine comprising a combination of coacting machine parts which are, a frame, a rotatable workshaft, means for securing said body on said shaft with the major axis of said surface coaxial therewith, power means operatively connected to rotate said shaft, a first mounting member, and means for operatively mounting said workshaft and power means thereon, first pivot means which are positioned in said frame and first mounting member vertically in alignment with the equatorial plane of said body and in spaced relation thereto, said first mounting member being angularly movable relatively in said frame about said pivot means, a second mounting member which carries an abrasive wheel and is mounted in a stationary position on said frame, a tool head pivotally mounted on said second member, second pivot means formed vertically cooperatively on the tool head and second mounting member so that said tool head is rotatable thereon, the distance between said first pivot means and said second pivot means being equal to the semi-major axis of the ellipsoidal body, actuator means for pivotally moving the first mounting member so as to swing about said first pivot means which is coaxial with said major axis of the ellipsoidal surface during generation of the ellipsoidal surface, a wide-faced surfacing tool, a motor and a tool shaft therefor whereon said surfacing tool is mounted for rotation, said motor and shaft being a component part of the aforesaid tool head and being so located that the working face of the tool contacts the ellipsoidal body along a horizontal line which is coplanar with a horizontal plane which includes the axis of the wheel and the axis of rotation of said body, the working face of the tool further intersecting the axis of said second pivot means, means for controlling the feed of said wheel including a horizontal slide mechanism formed normal to the direction of said spindle cooperatively on the motor and tool head, a swivel joint carried by said first mounting member at a stationary position in vertical alignment with a focal point of the ellipsoidal surface, an elongated rigid guide rod fixed to said tool head so as to extend into engagement with said swivel joint, said rod and joint being cooperatively formed to provide a sliding connection therebetween whereby changes of the angular relationship between the first and second mounting members, the rod slides in said joint as it pivots to bias the working face of the surfacing tool continuously into successive tangential positions along said ellipsoidal surface.

8. A machine for generating a true ellipsoidal surface of revolution on a rigid body, said machine comprising a combination of coacting machine parts which are, a frame, a rotatable workshaft, means for securing said body on said shaft with the major axis of said surface coaxial therewith, power means operatively connected to rotate said shaft, a first mounting member, and means for mounting said workshaft and power means operatively thereon, first pivot means which are constructed cooperatively in fixed position on said frame and first mounting member, said means being axially aligned coextensively with the minor axis of said ellipsoidal surface and being in spaced relation thereto, said first mounting member being angularly movable relative to said frame about said pivot means, a second mounting member which is mounted in a stationary position on said frame, a tool head pivotally mounted on said second mounting member, second pivot means formed cooperatively on the tool head and second mounting member and being axially parallel to the first pivot means, the horizontal distance between the first and second pivot means being equal to the semi-major axis of the ellipsoidal surface, said tool head being rotatable on the second mounting member, means anchored in said frame for pivotally moving the first mounting member so as to swing in a horizontal plane which includes said major axis of the ellipsoidal surface, said one member moving angularly relatively to the other member about said first pivot means during generation of the ellipsoidal surface, an axially elongated surface forming wheel, a motor and a shaft therefor whereon said wheel is mounted, said motor and shaft being a part of the aforesaid tool head and being so located thereon that the active working area of said wheel extends along a horizontal line which is coplanar with the axis of the wheel and the axis of rotation of said body, said line intersecting the axis of said second pivot means, a swivel joint carried by said first mounting member at a stationary position in vertical alignment with a focal point of the ellipsoidal surface, an elongated rigid guide rod fixed to said tool head so as to extend into engagement with said swivel joint, means on said rod and joint cooperatively forming a sliding connection therebetween whereby during changes of the angular relationship between the first and second mounting members, the rod slides in said joint while it pivots to move the active face of the surface finishing wheel into continuously successive tangential positions along the profile of said ellipsoidal surface, and means for varying the rotational speed of said workshaft according to such a law that the sum of the circumferential speeds of the ellipsoidal surface and said finishing wheel with respect to every point on said surface remain constant.

References Cited by the Examiner

UNITED STATES PATENTS

| 1,325,789 | 12/1919 | Johnsson | 51—33 |
| 2,290,051 | 7/1942 | Hinkley | 51—33 |
| 2,633,675 | 4/1953 | Ellis | 51—33 |

OTHER REFERENCES

Martin, L. C.: Technical Optics, vol. II, pages 357, 358.

HAROLD D. WHITEHEAD, *Primary Examiner.*